US009860833B2

United States Patent
Khay-Ibbat et al.

(10) Patent No.: US 9,860,833 B2
(45) Date of Patent: Jan. 2, 2018

(54) ACCESSORY DEVICE WHICH TRANSITIONS BETWEEN AN AUTONOMOUS MODE AND A COMPANION DEVICE RELAY MODE FOR CELLULAR COMMUNICATION

(71) Applicant: Apple Inc., Cupertino, CA (US)

(72) Inventors: Samy Khay-Ibbat, San Francisco, CA (US); Tarik Tabet, Los Gatos, CA (US); Rafael L. Rivera-Barreto, Santa Clara, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/013,738

(22) Filed: Feb. 2, 2016

(65) Prior Publication Data
US 2016/0262094 A1 Sep. 8, 2016

Related U.S. Application Data

(60) Provisional application No. 62/129,893, filed on Mar. 8, 2015.

(51) Int. Cl.
*H04W 48/18* (2009.01)
*H04W 4/00* (2009.01)
(Continued)

(52) U.S. Cl.
CPC ............ *H04W 48/18* (2013.01); *G06F 1/163* (2013.01); *H04M 1/7253* (2013.01);
(Continued)

(58) Field of Classification Search
CPC ... H04M 1/6066; H04B 1/3827; H04W 48/18
See application file for complete search history.

(56) References Cited

U.S. PATENT DOCUMENTS

2004/0037228 A1\* 2/2004 Quan .................. H04L 12/2697
370/241
2008/0113689 A1\* 5/2008 Bailey ................. H04M 1/6066
455/569.1
(Continued)

FOREIGN PATENT DOCUMENTS

EP 2458931 A1 11/2010
WO 2015120625 A1 8/2015

OTHER PUBLICATIONS

"Samsung Gear S User Manual," Dec. 12, 2014, Retrieved from the Internet: URL:http://downloadcenter.samsung.com/content/UM/201412/20141213042412336/ATT_SM-R75OA_Galaxy_Gear_S_English_User-Manual_TZ_N_J7_R8_AC.pdf, pp. 1-119.
(Continued)

*Primary Examiner* — Myron K Wyche
(74) *Attorney, Agent, or Firm* — Meyertons Hood Kivlin Kowert & Goetzel, P.C.; Jeffrey C. Hood (57) ABSTRACT

Some embodiments relate to an accessory device that may operate in a first mode, where the first radio of the accessory device is configured to perform cellular communication with a base station, or a second mode, where the second radio of the accessory device is configured to perform short-range communication with a companion device and utilize cellular functionality of the companion device to provide cellular communications through the companion device to the base station. The accessory device may operate to selectively transition between the first mode and the second mode based on one or more factors, such as signal strength of the short-range communication between the accessory device and the companion device, the relative batter level of the two devices, and/or a communications status of the companion device.

20 Claims, 5 Drawing Sheets

(51) Int. Cl.
*H04W 72/08* (2009.01)
*H04W 72/04* (2009.01)
*G06F 1/16* (2006.01)
*H04M 1/725* (2006.01)
*H04W 88/06* (2009.01)
*H04B 1/3827* (2015.01)
*H04M 1/60* (2006.01)
*H04W 52/02* (2009.01)
*H04W 88/04* (2009.01)

(52) U.S. Cl.
CPC ......... *H04W 4/008* (2013.01); *H04W 72/048* (2013.01); *H04W 72/0433* (2013.01); *H04W 72/08* (2013.01); *H04B 1/385* (2013.01); *H04B 2001/3861* (2013.01); *H04M 1/6066* (2013.01); *H04M 2250/02* (2013.01); *H04M 2250/06* (2013.01); *H04W 52/0261* (2013.01); *H04W 52/0277* (2013.01); *H04W 88/04* (2013.01); *H04W 88/06* (2013.01); *Y02B 60/50* (2013.01)

(56) References Cited

U.S. PATENT DOCUMENTS

| | | | |
|---|---|---|---|
| 2008/0224663 A1* | 9/2008 | Mack | B60K 6/445 320/132 |
| 2014/0106677 A1* | 4/2014 | Altman | H04B 1/3827 455/41.2 |
| 2015/0049591 A1 | 2/2015 | Adams et al. | |
| 2015/0160856 A1 | 6/2015 | Jang et al. | |
| 2015/0282237 A1 | 10/2015 | Su et al. | |

OTHER PUBLICATIONS

International Search Report and Written Opinion for International Application No. PCT/US2016/017272, pp. 1-16.

* cited by examiner

ACCESSORY DEVICE WHICH TRANSITIONS BETWEEN AN AUTONOMOUS MODE AND A COMPANION DEVICE RELAY MODE FOR CELLULAR COMMUNICATION

PRIORITY CLAIM

The present application claims benefit of priority to provisional patent application 62/129,893 titled "Accessory Device Which Transitions Between an Autonomous Mode and a Companion Device Relay Mode for Cellular Communication" filed on Mar. 8, 2015, which is hereby incorporated by reference in its entirety as though fully and completely set forth herein.

FIELD

The present application relates to wireless communication, including enabling an accessory device, such as a smart watch, to selectively either provide direct cellular communication or utilize a companion wireless device as a proxy for cellular communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. Wearable devices, such as smart watches, are a newer form of mobile electronic device. These and other devices may be referred to as accessory devices. In the past, the wireless communications capabilities of wearable devices have been generally limited; for example, some wearable devices have been capable of communicating only through wired interfaces or over short-range point-to-point technologies. Moreover, wearable devices typically have smaller batteries than larger portable devices such as smart phones and tablets.

It would be desirable for wearable devices to provide communications capabilities similar to those of larger devices, such as smart phones. Thus, improvements in the field are desirable.

SUMMARY

Embodiments are presented herein of, inter alia, an accessory device, such as a smart watch, and associated methods for enabling the accessory device to selectively use a companion device as a proxy for cellular communications, such as packet-based cellular communications. The accessory device may switch between operating in relay mode, in which the accessory device may use the cellular capabilities of the companion device to relay communications between the accessory device and a cellular base station, and autonomous mode, in which the accessory device may communicate cellular voice/data directly with the base station without relaying communications through the companion device. In some embodiments, the accessory device may use one or more of various measurements and/or conditions to determine whether or when to switch between relay mode and autonomous mode. The accessory device may switch between relay mode and autonomous mode during an active voice call or may otherwise change modes when no call is ongoing.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
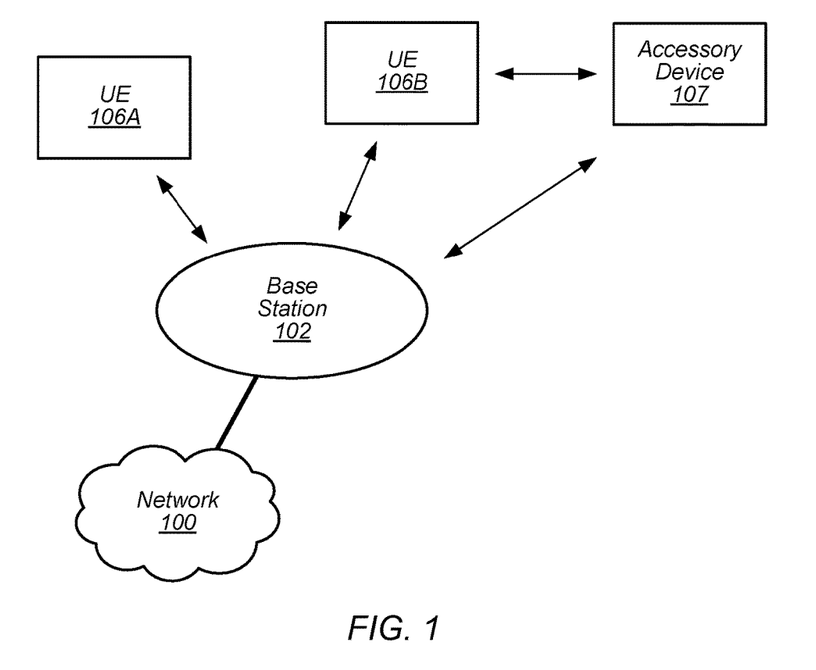
FIG. 1 illustrates an example wireless communication system including an accessory device, according to some embodiments.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, WLAN (Wi-Fi), Bluetooth, WiMAX, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the UE device 107, which may be referred to as an accessory device 107. The accessory device 107 may be any of various types of devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user, or possibly a different user. Thus, as another example, in the operation described herein the UE 106B may be a smart phone carried by a first user, and the accessory device 107 may be a smart watch worn by a second, different user. The UE 106B and the accessory device 107 may communicate using any of various short-range communication protocols, such as Bluetooth, Wi-Fi, etc.

The accessory device 107 includes communications capability, e.g., cellular communication capability, and hence is able to directly communicate with cellular base station 102. However, since the accessory device 107 is possibly limited in one or more of its communication capabilities, output power, and/or battery, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

Figure 2:
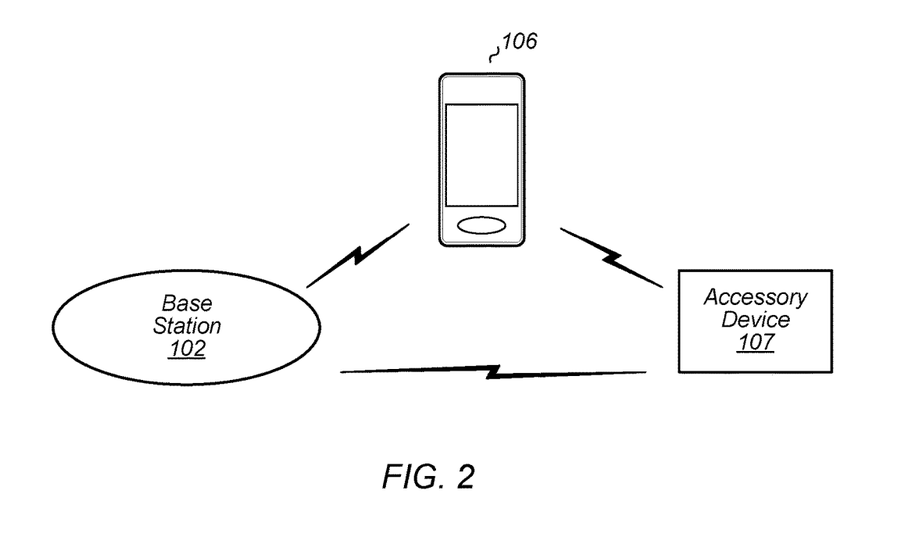
FIG. 2 illustrates an example system in which an accessory device can selectively either directly communicate with a cellular base station or utilize the cellular capabilities of an intermediate or proxy device such as a smart phone, according to some embodiments.

FIG. 2—Example System with Accessory Device

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the accessory device 107 may provide voice/data packets intended for the base station 102 over the short-range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of handheld device, a media player, a computer, a laptop or virtually any type of wireless device. When the accessory device 107 is configured to indirectly communicate with the base station using the cellular functionality of an intermediate or proxy device, the accessory device may be said to be in "relay mode."

The various embodiments herein are described with respect to the accessory device 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the accessory device 107 to selectively using either its own Wi-Fi functionality (autonomous mode) to communicate with a Wi-Fi access point, or use the Wi-Fi functionality of the UE 106 (relay mode) for Wi-Fi communications.

The accessory device 107 may include a processor that is configured to execute program instructions stored in memory. The accessory device 107 may perform any of the method embodiments described herein by executing such stored instructions. Alternatively, or in addition, the accessory device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with WiFi capabilities (and possibly limited or no cellular communication capabilities) that is not currently near a WiFi hotspot and hence is not currently able to communicate over WiFi with the Internet. Thus, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
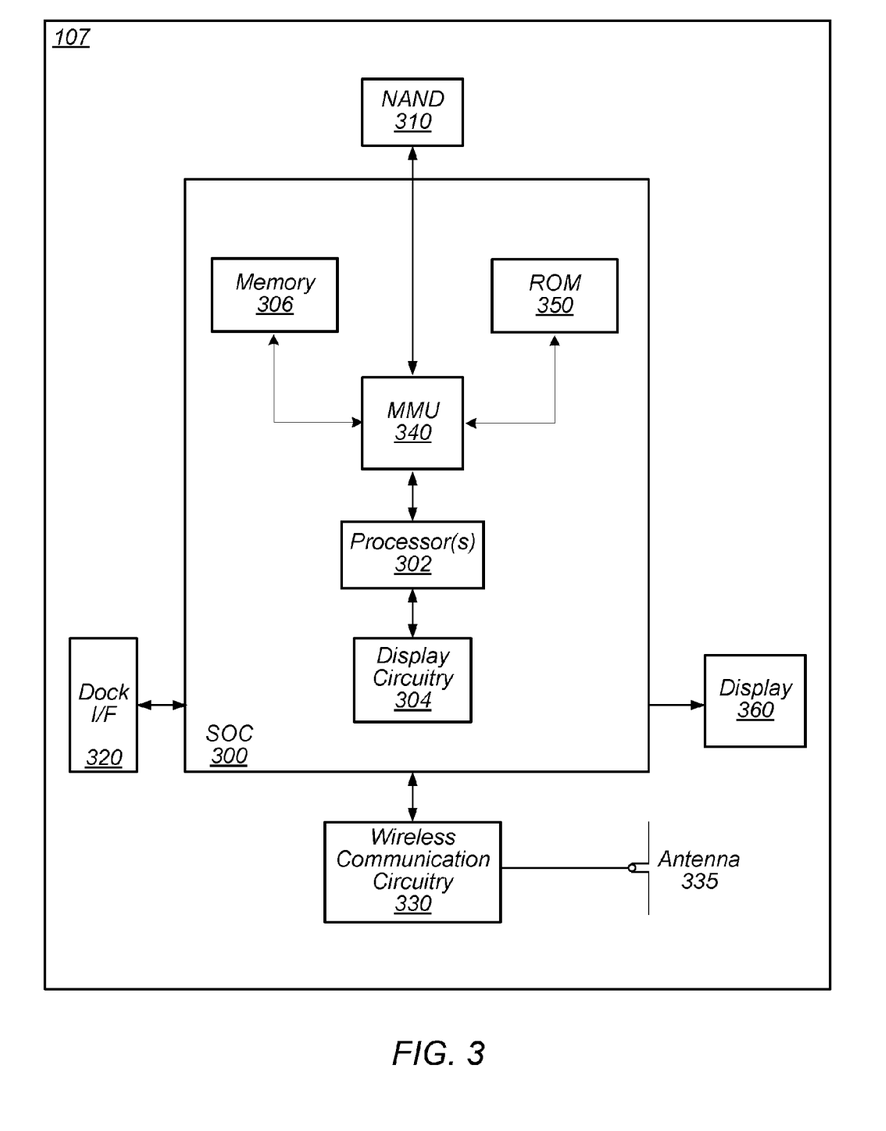
FIG. 3 is a block diagram illustrating an example accessory device, according to some embodiments.

FIG. 3—Example Block Diagram of an Accessory Device

FIG. 3 illustrates one possible block diagram of an accessory device 107. As shown, the UE 107 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The accessory device 107 may also include other circuits or devices, such as the display circuitry 304, radio 330, connector I/F 320, and/or display 340.

In the embodiment shown, ROM 350 may include a bootloader, which may be executed by the processor(s) 302 during bootup or initialization. As also shown, the SOC 300 may be coupled to various other circuits of the accessory device 107. For example, the accessory device 107 may include various types of memory, a connector interface 320 (e.g., for coupling to a computer system), the display 360, and wireless communication circuitry (e.g., for communication using LTE, CDMA2000, Bluetooth, WiFi, NFC, GPS, etc.).

The accessory device 107 may include at least one antenna, and in some embodiments multiple antennas, for performing wireless communication with base stations and/or other devices. For example, the accessory device 107 may use antenna 335 to perform the wireless communication. As noted above, the UE may in some embodiments be configured to communicate wirelessly using a plurality of wireless communication standards or radio access technologies (RATs).

As described herein, the accessory device 107 may include hardware and software components for implementing methods according to embodiments of this disclosure. The processor 302 of the accessory device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Figure 4:
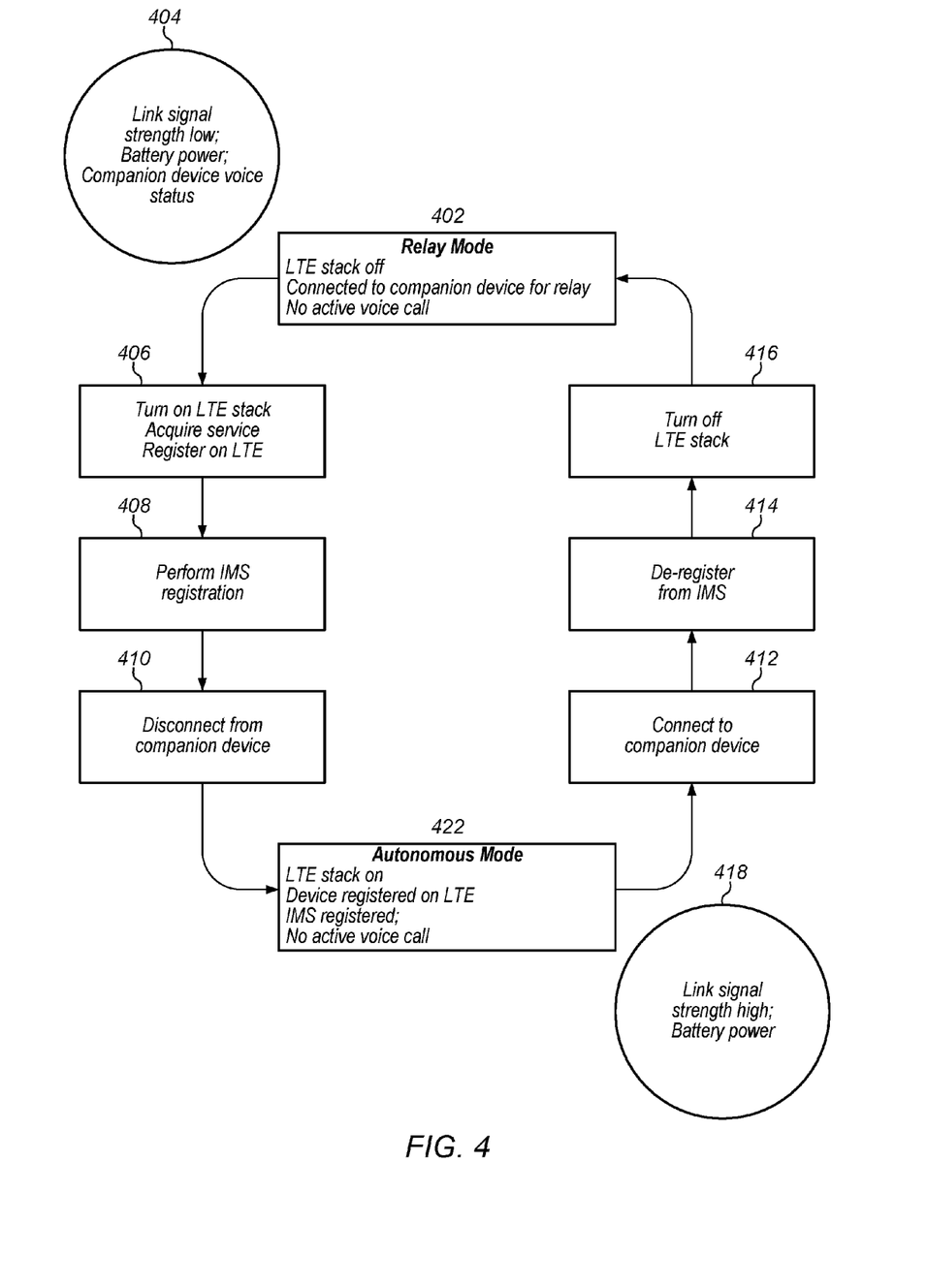
FIG. 4 is a flow diagram illustrating example operation whereby an accessory device may switch between autonomous and relay modes when no active call is ongoing, according to some embodiments.
Figure 5:
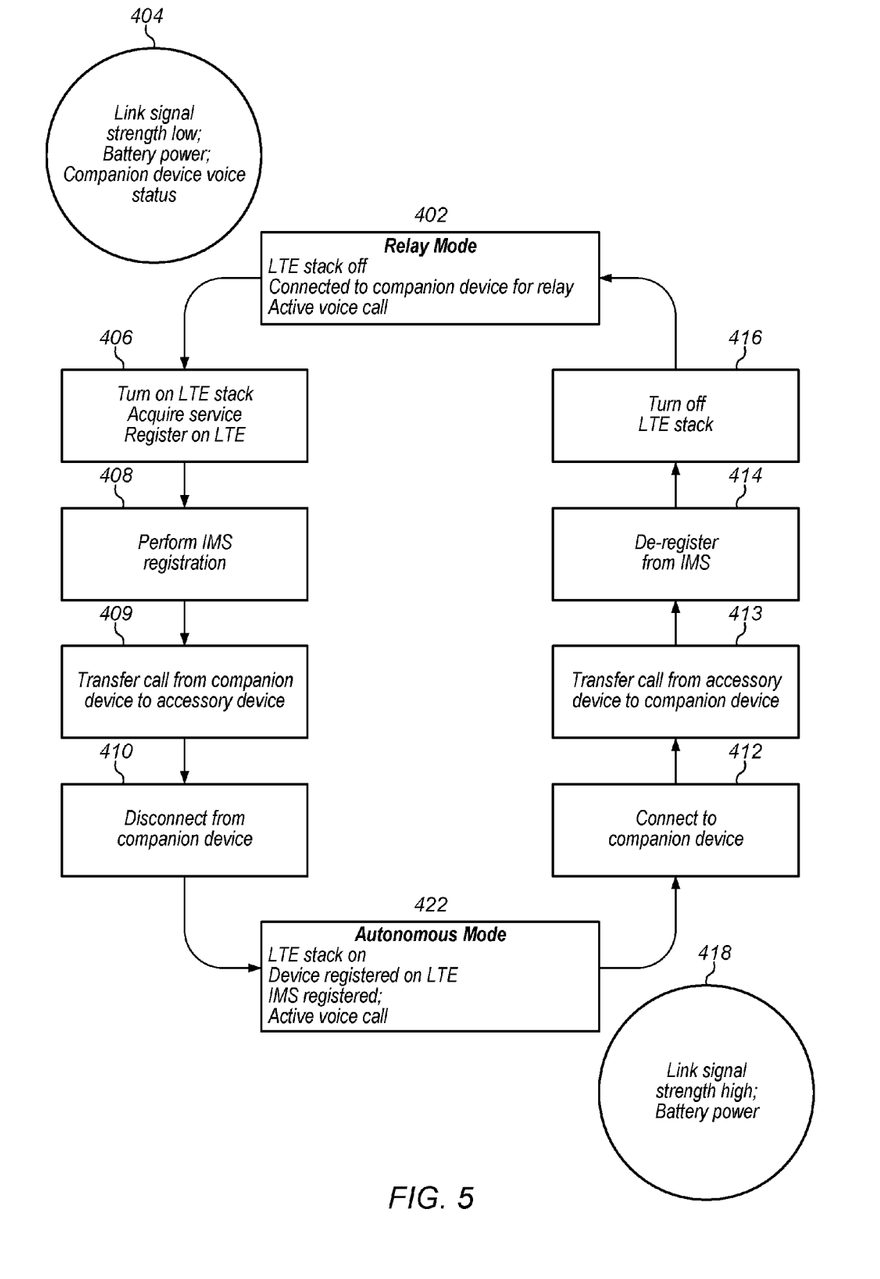
FIG. 5 is a flow diagram illustrating example operation whereby an accessory device may switch between autonomous and relay modes during an active call, according to some embodiments.

FIGS. 4 and 5—Switching Between Relay and Autonomous States

FIGS. 4 and 5 are flow diagrams illustrating example methods by which the accessory device 107 may switch between operating in autonomous mode and operating in relay mode for wireless communications (e.g., LTE or VoLTE communications). As described above, while operating in relay mode, the accessory device 107 may use the companion device, UE 106, which may be a smart phone, to relay communications between the accessory device 107 and a base station 102. The companion device 106 (i.e., the relay device or the proxy device) may serve as a proxy or intermediary to convey communications between the accessory device and the base station 102. Conversely, in autonomous mode, the accessory device 107 may communicate directly with the base station 102 using a wireless link (cellular link) between the accessory device and the base station. Here the accessory device 107 may communicate independently (i.e., autonomously) with the cellular base station, much like a cell phone, without using the companion device to communicate to the base station.

The accessory device 107 may selectively operate in, or switch between, autonomous mode or relay mode during an active voice call or when no voice call is ongoing. FIG. 4 illustrates switching between the two modes of communication when no active voice call (or no active data communication) is occurring. FIG. 5 illustrates switching between the two modes of communication during an active voice call.

FIG. 4—Switching Between Relay and Autonomous States without Active Voice Call

As shown in FIG. 4, at 402 the accessory device 107 is currently operating in relay mode, in which the accessory device 107 may use the companion device to proxy or relay wireless communications, e.g., packet-based communications such as LTE communications, with the base station. The accessory device 107 may use the companion device for other types of communication as well, such as SMS, etc. In some embodiments, the accessory device may be connected to the companion device wirelessly using Bluetooth Low Energy (BTLE) or Apple Wireless Direct Link (AWDL) technologies. The accessory device 107 may not be currently operating a cellular communications protocol stack, e.g., an LTE stack, since it is not currently using its cellular communication circuitry to directly communicate with the base station. For example, the LTE stack may be considered to be inactive or "off". Here, the accessory device may not be engaged in an active voice call. As noted above, methods or scenarios wherein the accessory device may operate an ongoing voice call are described below in relation to FIG. 5.

While operating in relay mode at 402, under certain conditions the accessory device 107 may transition to operating in autonomous mode 422. The accessory device 107 may use one or more of various items of information to determine whether to transition from relay mode 402 to autonomous mode 422, i.e., to cease using the companion device 106 to communicate to the base station 102. Block 404 represents example conditions that may be used to determine if the accessory device 107 should transition from relay mode 402 to autonomous mode 422. As shown in 404, these items of information may comprise data regarding one or more of the signal strength of the link between the accessory device 107 and the companion device 106, the power or battery status of the companion device 106 and/or the accessory device 107, the link between the companion device 106 and the base station 102, or whether the companion device 106 presently supports voice or SMS communications.

In some embodiments, information regarding the signal strength of the link between the accessory device 107 and the companion device 106 may influence or determine whether the accessory device 107 desires to switch to autonomous mode. For example, if the signal strength of the link between the accessory device and the companion device is low (or getting lower) as determined by various measurements, or if the link has failed altogether (i.e., the accessory device can no longer communicate with the companion device), then the accessory device may determine to switch to autonomous mode. In some scenarios, the companion device 106 may not be in close proximity to the accessory device 107 or the link between the two devices may be obstructed, or the signal strength or quality of the link may otherwise be considered low or insufficient.

The power status of the companion device 106 may also influence the decision to switch from relay mode to autonomous mode. For example, if the companion device 106 is operating in a low battery state, e.g., if the battery of the companion device 106 drops below a threshold, then it may signal the accessory device 107 regarding its battery status, and the accessory device may respond by switching to autonomous mode. This may avoid overly burdening the companion device 106 when it is operating with low battery, and may also avoid interrupting ongoing communications should the companion device 106 cease to relay communications due to power constraints.

In other scenarios, if the companion device 106 is switched to "airplane mode" or otherwise if the cellular capability of the companion device 106 is lost or disabled, then as a result the accessory device 107 may be caused to transition from relay mode to autonomous mode. In some embodiments, if the user provides input to switch the companion device 106 to airplane mode or otherwise to disable cellular communications, the companion device 106 may provide signaling to the accessory device 107 indicating that the companion device 106 is about to deactivate cellular capabilities, and in response the accessory device 107 may transition from relay mode to autonomous mode. Other conditions or criteria, in addition to or instead of those described above, may also be used to determine when or whether the accessory device 107 transitions from relay mode to autonomous mode.

If the conditions in 404 are satisfied such that the accessory device should transition from relay mode 402 to autonomous mode 422, then the accessory device may perform steps 406, 408 and 410.

At 406 the accessory device 107 may enable its LTE stack for execution, acquire service with a base station, and register on the LTE network. In acquiring service with a base station, the accessory device 107 may use current cell coverage information (also called base station information) previously received from the companion device 106, as discussed further below with regard to FIG. 6. This cell coverage information may allow the accessory device 107 to more efficiently acquire the best possible cell.

At 408 the accessory device 107 may perform IMS (IP Multimedia Subsystem) registration. This may involve the accessory device 107 registering with an IMS server so that it is able to receive multimedia data, such as videoconferencing calls (e.g., Apple Facetime), or similar data services.

At 410 the accessory device 107 may disconnect from the companion device 106. Thus in 410 the accessory device 107 may discontinue communicating with the companion device 106 with its short-range communication circuitry, e.g., Bluetooth circuitry. After the accessory device 107 performs 406, 408 and 410, the accessory device has transitioned to autonomous mode 422, wherein its LTE stack is on or executing, the device is registered on LTE and registered for IMS. Also, there still may be no active voice call.

While operating in autonomous mode at 422, under certain conditions the accessory device 107 may transition to operating in relay mode 402. The accessory device 107 may use one or more of various items of information to determine whether to transition from autonomous mode 422 to relay mode 402, i.e., to cease direct communication with the base station and begin using the companion device 106 as a proxy or intermediary to communicate to the base station 102.

Block 418 presents example items of information that may be used to determine if the accessory device 107 should transition from autonomous mode 422 to relay mode 402. The items of information may comprise data regarding one or more of the signal strength of the link between the accessory device and the companion device, the power or battery status of the companion device and/or the accessory device, the link between the companion device and the base station, or whether the companion device presently supports voice or SMS communications.

In some embodiments the signal strength or quality of the link between the companion device 106 and the accessory device 107 may determine or influence whether the accessory device switches to relay mode. For example, if one or more measurements or conditions regarding the link between the two devices indicate the link to be of sufficient strength or quality, e.g., through comparison to one or more threshold values, then the accessory device 107 may operate to switch to relay mode 402 in order to leverage the link with the companion device 106.

Information regarding the current capabilities of the companion device 106 for performing certain cellular communications may also be used to determine whether the accessory device 107 should switch to operating in relay mode, i.e., to using the companion device to relay communications with the base station 102. For example, if the companion device 106 does not currently support cellular communications such as voice and SMS communications, e.g., because it is not registered with the base station or because its cellular functionality is otherwise off or disabled, then the accessory device may determine not to switch to relay mode. In some embodiments, the companion device 106 may signal the accessory device 107 regarding its communications capabilities and/or registration status. The accessory device 107 may determine to switch into relay mode if the companion device 106 presently supports a certain level of cellular connectivity, e.g., if the companion device is registered with the base station to perform cellular communications such as IMS communications.

In some embodiments, the accessory device 107 may use information regarding the battery status of the companion device 106 in determining whether to switch to relay mode. In some embodiments, if the companion device 106 is determined to have low battery according to various factors, then the accessory device may not use the companion device for relaying communications. Conversely, the accessory device may switch to relay mode if it determines that the companion device has adequate battery power to serve as a proxy and to relay communications between the accessory device and the base station.

Any combination of the abovementioned factors, as well as other conditions or factors, may be used to determine whether the accessory device 107 should transition from autonomous mode 422 to relay mode 402. For example, information regarding the battery status of the accessory device may also be used. In some scenarios, the accessory device may desire to transition into relay mode if its own battery level is low, as operating in relay mode may reduce strain on device resources.

If or when the accessory device 107 determines to transition from autonomous mode 422 to relay mode 402, e.g., because the conditions at 418 are satisfied, then the accessory device may perform steps 412, 414, and 416.

At 412 the accessory device 107 may establish a connection to the companion device 106. In some embodiments the accessory device 107 may establish a wireless link to the companion device 106 using Bluetooth Low Energy (BTLE) or Apple Wireless Direct Link (AWDL) technologies.

At 414 the accessory device 107 may operate to cancel or disable registration with the base station 102 for IMS (IP Multimedia Subsystem) communications. At 416 the accessory device may deactivate its communications protocol stack, e.g., its LTE stack. Hence, in transitioning to relay mode, the accessory device 107 may selectively disable some of its own cellular communications functions because in relay mode the accessory device may use the companion device 106 to perform cellular communications.

After the accessory device 107 performs 412, 414 and 416, the accessory device may have transitioned to relay mode 402 and may be connected to the companion device 106, which may serve as a proxy for performing cellular communications with the base station 102. As described above with regard to 402 and 404, the accessory device may remain in relay mode for a period of time or otherwise may transition from relay mode to autonomous mode according to one or more conditions. The accessory device may still not be engaged in a voice call; methods or scenarios wherein the accessory device may operate an ongoing voice call are described below in relation to FIG. 5.

FIG. 5—Switching Between Relay and Autonomous States During Active Call

FIG. 5 is a flow diagram illustrating an example method by which the accessory device 107 may switch between operating in autonomous mode and operating in relay mode during an ongoing voice call.

At 402 the accessory device 107 may operate in relay mode, wherein it may be connected to the companion device 106 and its LTE stack may be disabled as described above with regard to FIG. 4. In some scenarios, the accessory device may be engaged in an active voice call. During a voice call, the companion device 106 may be used as an intermediary for voice communications, such as Voice over LTE (VoLTE) communications, exchanged between the accessory device 107 and the base station 102.

If the accessory device 107 determines to transition to operating in autonomous mode according to certain conditions as described above with regard to FIG. 4, then the accessory device may perform 406, 408, 409, and 410. At 406 the accessory device may enable its LTE stack for execution, acquire service with a base station, and register on the LTE network. In acquiring service with a base station, the accessory device 107 may use current base station information previously received from the companion device 106, as discussed further below with regard to FIG. 6. At 408 the accessory device may perform IMS (IP Multimedia Subsystem) registration. Hence, the accessory device 107 may operate to enable direct communications with the base station 102.

At 409 the ongoing call may be transferred from the companion device 106 to the accessory device 107, which may now be registered with the base station and capable of performing direct cellular communications without using the companion device. The companion device may cease to relay communications between the accessory device and the base station 102, and the accessory device may begin to communicate directly with the base station in order to maintain the voice call.

After the accessory device 107 disconnects from the companion device 106 at 410 (as described above with regard to FIG. 5), the accessory device has transitioned to autonomous mode 422. Here, the accessory device 107 may exchange frequent and/or periodic communications, such as VoLTE communications, with the base station 102 in order to maintain the voice call. The LTE stack on the accessory device may execute to handle voice communications with the base station.

To transition from operating in autonomous mode 422 to operating in relay mode 402 during an active voice call, the accessory device may establish (or reestablish) a connection with the companion device at 412. At 413 the accessory device may operate to transfer the voice call to the companion device. The accessory device may cease to communicate directly with the base station and may begin to use the companion device as a proxy to sustain the voice call. At 414 and 416 the accessory device may disable certain communications processes, which may no longer be required to handle the voice call.

After the accessory device 107 has transferred the call to the companion device 106, disabled its LTE stack, and cancelled its IMS registration, the accessory device may operate in relay mode 402 The companion device may actively exchange communications, e.g., for the ongoing voice call, with the base station 102.

Figure 6:
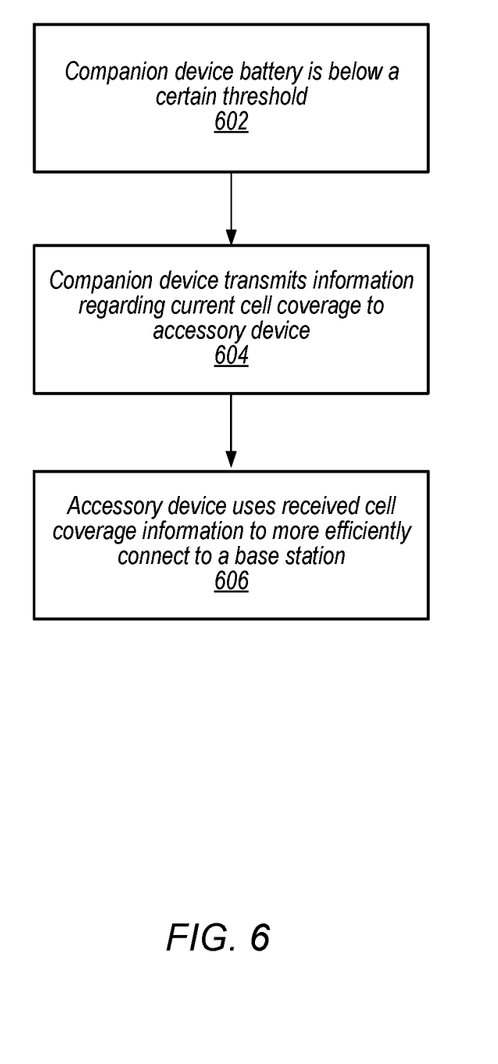
FIG. 6 is a flowchart diagram illustrating a method whereby a companion device may notify an accessory device of cell coverage information, according to some embodiments.

FIG. 6—Companion Device Communicates Base Station Information to Accessory Device FIG. 6 is a flowchart diagram illustrating an example method by which the accessory device 107 may receive information from the companion device 106 usable by the accessory device to more efficiently connect to the base station 102.

At 602 one or more conditions may exist (or arise) that may potentially cause the accessory device to switch from operating in relay mode to operating in autonomous mode, i.e., to cease using the companion device as a proxy for cellular communications. These one or more conditions may comprise various conditions as described above in regard to 404. For example, if the companion device battery level is below a certain threshold value, then it may be desirable to initiate a transition between operating in relay mode to operating in autonomous mode. Transitioning the accessory device to autonomous mode may avoid overly burdening the companion device 106 when it is operating with low battery, and may also avoid interrupting ongoing communications should the companion device 106 cease to relay communications due to power constraints.

At 604 the companion device may transmit information regarding current cell coverage to the accessory device.

Examples of current cell coverage information shared by the companion device may include one or more of serving cell ID, RSRP (Reference Signal Received Power), neighbor cells and their RSRP, and/or certain SIB information. This information may be transmitted in response to the one or more conditions as determined at 602, e.g., the companion device battery level being below a certain threshold value. In some embodiments, the companion device may communicate the information as part of the process whereby the accessory device transitions from operating in relay mode to autonomous mode. For example, prior to disconnecting from the accessory device at 410, the companion device may transmit the information regarding current cell phone coverage to the accessory device.

In some embodiments, the companion device may transmit information regarding current cell phone coverage to the accessory device on frequent or periodic intervals. In these embodiments, the information may not be transmitted in response to one or more conditions as described above, but automatically and/or periodically. This may prepare for scenarios in which the link between the accessory device and the companion device unexpectedly fails or otherwise for scenarios in which the accessory device is no longer able to use the companion device as a proxy for cellular communications and may begin to communicate directly with the base station.

At 606 the accessory device may have received the information regarding current cell coverage as communicated at 604. The accessory device may use the received information to connect to the base station. Without this information, the process of establishing an initial connection with the base station may be more time-consuming and/or burden resources on the accessory device. For example, without this information, the accessory device may need to perform one or more processes to identify and communicate various setup information with the base station. With the information regarding the base station received from the companion device 106, the accessory device 107 may more efficiently initiate and/or establish a connection to the base station for use in subsequent direct communications with the base station.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An accessory device, comprising:
at least one antenna for performing wireless communication;
a first radio coupled to the at least one antenna, wherein the first radio is configured to perform cellular communication with a base station;
a second radio coupled to the at least one antenna, wherein the second radio is configured to perform short-range communication with a companion device; and
one or more processors coupled to the first and second radios, wherein the one or more processors and the first and second radios are configured to perform wireless communications using the at least one antenna;
wherein the accessory device is configured to:
operate in a first mode where the first radio of the accessory device is configured to perform cellular communication with a base station;
operate in a second mode where the second radio of the accessory device is configured to perform short-range communication with the companion device, and wherein the accessory device is configured to utilize cellular functionality of the companion device to provide cellular communications through the companion device to the base station; and
selectively transition between the first mode and the second mode based on one or more factors, wherein the one or more factors comprise an amount of remaining battery power of the accessory device.

2. The accessory device of claim 1,
wherein the one or more factors comprise a signal strength of the short-range communication between the accessory device and the companion device.

3. The accessory device of claim 1,
wherein the one or more factors comprise a remaining battery power of the companion device.

4. The accessory device of claim 1,
wherein the one or more factors comprise a cellular communication status of the companion device.

5. The accessory device of claim 1,
wherein the one or more factors comprise a cellular communication status of the accessory device.

6. The accessory device of claim 1,
wherein an active voice call is currently being performed by one of the accessory device or the companion device; and
wherein the accessory device is configured to transition the active voice call either to or from the companion device during transition between the first mode and the second mode.

7. The accessory device of claim 1,
wherein the accessory device is a smart watch.

8. An accessory device, comprising:
at least one antenna for performing wireless communication;

a first radio coupled to the at least one antenna, wherein the first radio is configured to perform cellular communication with a base station;

a second radio coupled to the at least one antenna, wherein the second radio is configured to perform short-range communication with a companion device;

one or more processors coupled to the first and second radios, wherein the one or more processors and the first and second radios are configured to perform wireless communications using the at least one antenna;

wherein the accessory device is configured to:

operate in a first mode where the second radio of the accessory device is configured to perform short-range communication with the companion device, and the accessory device is configured to utilize cellular functionality of the companion device to provide cellular communications through the companion device to the base station;

transition from the first mode to a second mode due to one or more factors, wherein in the second mode the first radio of the accessory device is configured to perform cellular communication directly with the base station, wherein the one or more factors comprise an amount of remaining battery power of the companion device.

9. The accessory device of claim 8, wherein the one or more factors comprise a signal strength of the short-range communication between the accessory device and the companion device being below a certain threshold.

10. The accessory device of claim 8, wherein the one or more factors comprise a communication received from the companion device indicating that the accessory device should transition from the first mode to the second mode.

11. The accessory device of claim 10, wherein the communication received from the companion device is issued by the companion device because the cellular communication link between the companion device and the base station has been disabled or lost.

12. The accessory device of claim 8, wherein the accessory device is engaged in an active voice call while operating in the first mode, wherein a call stack of the accessory device is disabled and the active voice call is relayed through the companion device to the base station.

13. The accessory device of claim 12, wherein, as part of the transition from the first mode to a second mode, the accessory device activates its call stack and begins to handle the active voice call.

14. The accessory device of claim 8, wherein the accessory device is further configured to:
receive information from the companion device, wherein the information is usable by the accessory device to facilitate the transition from the first mode to the second mode.

15. The accessory device of claim 14, wherein the information is issued by the companion device in response to at least one of the one or more factors, directly prior to or as part of the transition from the first mode to the second mode.

16. The accessory device of claim 14, wherein the information is issued by the companion device on frequent or periodic intervals while the accessory device is operating in the first mode.

17. The accessory device of claim 14, wherein the information comprises information regarding the base station or current cell coverage.

18. The accessory device of claim 14, wherein the accessory device is further configured to:
use the information from the companion device to connect to the base station as part of the transition from the first mode to the second mode.

19. A method for operating an accessory device, the method comprising:

by one or more processors coupled to first and second radios, wherein the one or more processors and the first and second radios are configured to perform wireless communications:

operating in a first mode wherein the one or more processors are configured to perform cellular communication directly with a base station using the first radio;

selectively and automatically transitioning from the first mode to a second mode based on one or more factors, wherein the one or more factors comprise an amount of remaining battery power of the accessory device and wherein in the second mode the second radio of the accessory device is configured to perform short-range communication with the companion device, and the accessory device is configured to utilize cellular functionality of the companion device to provide cellular communications through the companion device to the base station.

20. The method of claim 19, wherein an active voice call is currently being performed by one of the accessory device or the companion device; and wherein the accessory device is configured to transition the active voice call either to or from the companion device during transition between the first mode and the second mode.

* * * * *